May 19, 1953     F. W. FARNAM ET AL     2,639,174
COMBINED SHIM AND GASKET
Filed Oct. 20, 1950
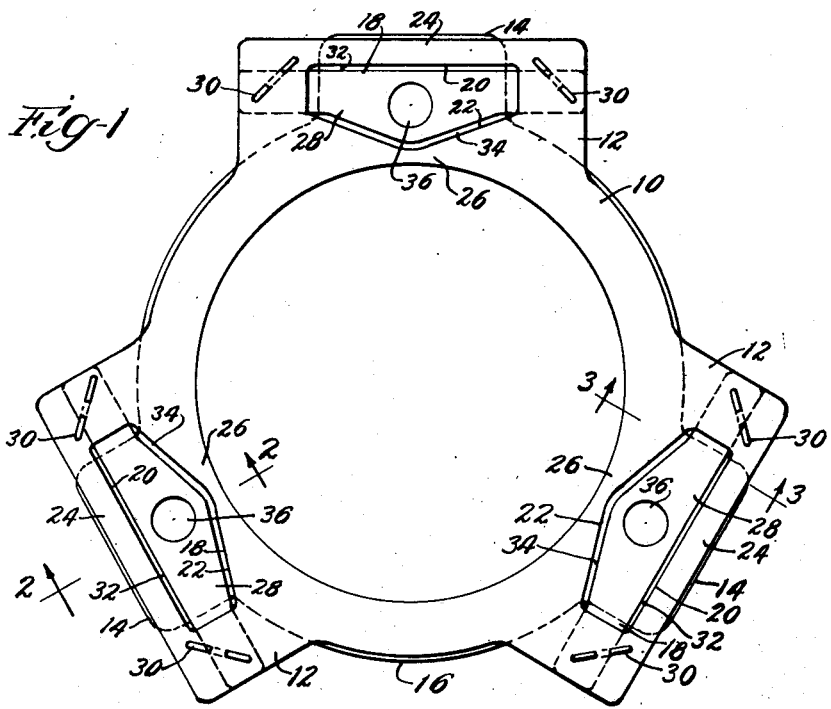
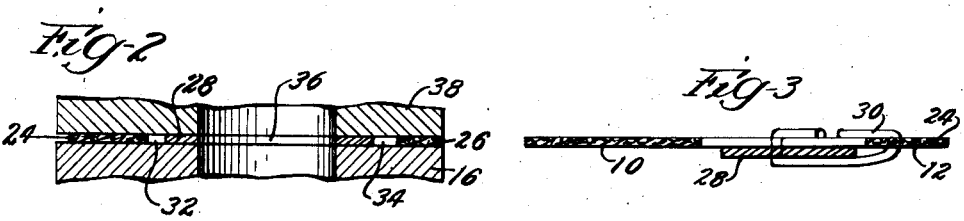
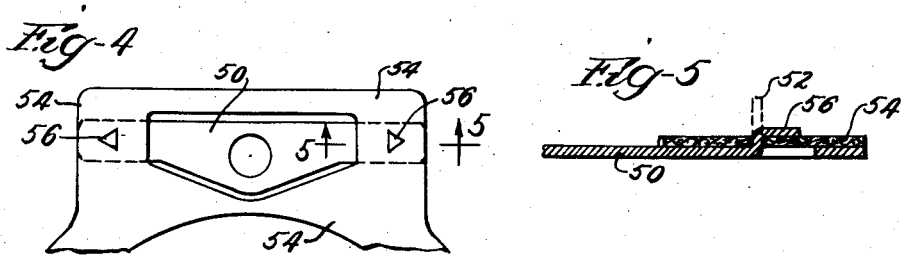
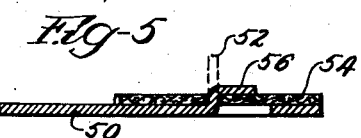
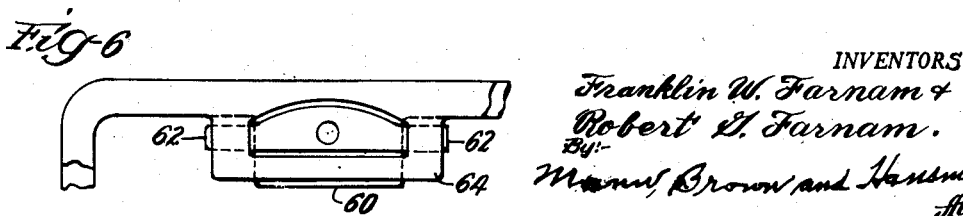
INVENTORS.
Franklin W. Farnam &
Robert L. Farnam.

Patented May 19, 1953

2,639,174

UNITED STATES PATENT OFFICE 2,639,174

COMBINED SHIM AND GASKET

Franklin Woolley Farnam, Elmhurst, and Robert G. Farnam, Glen Ellyn, Ill., assignors to F. D. Farnam Co., Chicago, Ill., a corporation of Illinois Application October 20, 1950, Serial No. 191,264

9 Claims. (Cl. 288—20)

Our invention relates to a combined shim and gasket for effecting a predetermined spacing and fluid-tight seal between two parts of a housing or other similar mechanical structure.

In present practice it is customary to provide shims between parts of a housing or similar mechanical structure to give a predetermined spacing of the housing parts. Such shims are customarily formed of metal and are ineffective to establish a fluid-tight seal between the parts of the housing which they separate. It therefore is necessary to provide separate sealing means such as an annular gasket of the O type.

This current practice of providing separate shims and gaskets increases the difficulty and expense of assembling housings and other similar structures on a mass production basis and one object of our invention is to provide a combined shim and gasket which may be more easily and quickly assembled in a housing or other structure.

The separate shims and gaskets presently used in housing assemblies and other similar structures are also relatively expensive and another object of our invention is to provide a combined shim and gasket which is less expensive than the separate shims and gaskets heretofore used.

A further object of our invention is to provide a combined shim and gasket which is simple and inexpensive to manufacture, may be economically packed and shipped, and may be quickly and conveniently applied to a structure in the assembly operation.

A further object of our invention is to provide a combined shim and gasket which will afford accurate spacing and effective sealing of the parts between which it is located.

Further objects and advantages will become apparent as the description proceeds.

In the drawing:

Fig. 1 is a top plan view showing a preferred embodiment of our invention resting upon a housing part;

Fig. 2 is a sectional view taken along the line 2—2 of Fig. 1 but showing the combined shim and gasket assembled between two housing parts;

Fig. 3 is a sectional view of the combined shim and gasket of Fig. 1 before assembly and is taken in a plane corresponding to the plane 3—3 of Fig. 1;

Fig. 4 is a partial plan view of a modified form of combined shim and gasket;

Fig. 5 is a partial sectional view taken in the plane of line 5—5 of Fig. 4; and Fig. 6 is a fragmentary plan view of a third embodiment of our invention.

In the embodiment of Figs. 1, 2, and 3, our combined shim and gasket comprises an annular gasket 10 formed of fiber, rubber, leather, or any other suitable material, and having integral outwardly projecting ears 12 which in the particular embodiment shown are three in number and correspond generally to the bosses 14 of a housing part 16. Each ear 12 has a cut-away segment 18 adapted to overlie one of the bosses 14.

The cut-away segments 18 are shown as being elongated and are of such length that the ends of the cut-away segments extend slightly beyond the lateral extremities of the bosses 14. Each of the segments 18 has a straight side 20 and a V-shaped side 22 and each has a maximum width less than the combined thickness of the adjacent section of the housing and boss to provide strips 24 and 26 of gasket material in contact with the housing parts on opposite sides of the cut-away segments 18. A strip 28 of shim material is attached to each ear 12 by clips 30 which secure each end of a strip 28 to the annular gasket 10. The central portion of each shim strip 28 conforms generally to but is slightly narrower than a cut-away segment 18 to provide narrow openings 32 and 34 between the edges of the strip 28 and the corresponding edges of the gasket 10.

In the particular embodiment shown the shim strips 28 are provided with holes 36 to receive the bolts for securing the housing part 16 to a complementary housing part, such for example as the part 38 shown in Fig. 2. This figure illustrates the relationship of the two housing parts 16 and 38 with our novel combined gasket and shim therebetween when these parts are in assembled relationship. This figure particularly emphasizes the function of the slot-like openings 32 and 34 which separate the edges of the shim strip from the adjacent edges of the cut-away segment of the gasket whereby overlapping of the gasket and shim strip is prevented between the housing parts and the spacing of these parts is determined solely by the thickness of the shim strip alone. In this connection it should be borne in mind that the portions of the gasket which overlie the ends of the shim strips and are attached thereto by the clips 30 are located outside of the housing parts and have no effect on the spacing thereof.

In the construction of our combined shim and gasket, the material of which the gasket is formed has a normal thickness somewhat greater than that of the shim strips 28 and is compressible to such a degree that when the housing parts are spaced a distance determined by the thickness of the shim strips, the gasket forms an effective seal between the housing parts. If the gasket part of the combination is made of a non-compressible material such as rubber, the gasket part is provided with one or more ribbed surfaces or otherwise given a conformation such that the shim strips alone will determine the spacing of the housing parts and the gasket material will establish an effective seal under such conditions.

In Figs. 4 and 5 we have illustrated a modified form of our invention. In this form of our invention the ends of the shim strips 50 are initially provided with punched-out upstanding fingers 52 which can be readily forced through the gasket part 54 and then bent over as indicated at 56 to secure and firmly hold the shim strips and gasket material in assembled relationship. In all other respects the embodiment of Figs. 4 and 5 may be identical with the embodiment of Figs. 1 to 3 inclusive.

As heretofore pointed out it is essential that any overlapping of the shim strips and gasket material must be so positioned that when the combined shim and gasket is inserted between the parts of the housing or other mechanical structure, these overlapping portions will be outside of the engaging surfaces of the housing parts. In the particular embodiments illustrated in Figs. 1 to 5 these overlapping portions of the shim strips and gasket material are shown as being outside of the assembled housing. Such an arrangement however is not essential since the overlapping portions of the shim strips and gasket material may be within the housing provided they are not between the gasket and shim-engaging faces of the housing parts.

This latter arrangement is illustrated in Fig. 6 showing a housing part with internal bosses 60 and a combined shim and gasket in which the ends 62 of the shim strips which overlap the adjacent portions of the gasket ear 64 are located within the chamber formed by the housing parts. It will be understood that the ends of the shim strips may be secured to the gasket part in any suitable manner and in this particular embodiment of our invention a cement is used as a securing means in lieu of the clips and fingers of the previous embodiments.

While we have referred to housing constructions utilizing bosses or ears, our invention is not limited to a shim and gasket combination designed for use only with housings having bosses or ears. In many instances our combined shim and gasket can be utilized with housings having no bosses or ears but wherein the shape of the housing itself is relied upon to provide opposing surfaces between which one or more gasket openings incorporating a shim or shims can be interposed, with all overlapping portions of gasket and shim being located to one side of the complementary surfaces so that the thickness of the shim alone determines the spacing of such surfaces.

It will be understood that our invention is not limited to the particular embodiments illustrated and described but may assume numerous other forms and includes all variations, modifications and equivalents coming within the comprehension of the appended claims.

We claim:

1. A combined shim and gasket adapted to be inserted between machine parts and comprising a gasket for effecting a seal between opposed surfaces of such parts, said gasket having a cut-away segment adapted to be located between such surfaces, and a shim extending transversely of said cut-away segment and adapted to space said surfaces, said shim and gasket having attached overlapping portions adapted to be located outside of said surfaces.

2. A combined shim and gasket adapted to be inserted between machine parts and comprising a gasket for effecting a seal between opposed surfaces of such parts, said gasket having a cut-away segment adapted to be located between such surfaces, a shim extending beside said cut-away segment and adapted to space said surfaces, said shim and gasket having overlapping portions adapted to be located beyond said surfaces, and means for securing together the overlapped parts of said shim and gasket.

3. A combined shim and gasket adapted to be inserted between machine parts and comprising a gasket for effecting a seal between opposed surfaces of such parts, said gasket having a cut-away segment adapted to be located between such surfaces, a shim extending across said cut-away segment and adapted to space said surfaces, said shim having ends attached to and overlapping portions of said gasket located beyond said surfaces.

4. A combined shim and gasket adapted to be inserted between machine parts and comprising a gasket for effecting a seal between opposed surfaces of such parts, said gasket having a cut-away segment adapted to be located between such surfaces, a shim extending across said cut-away segment and adapted to space said surfaces, said shim having ends attached to and overlapping portions of said gasket located beyond said surfaces, all of the shim between said surfaces being spaced from said gasket.

5. A combined shim and gasket adapted to be inserted between machine parts and comprising a gasket for effecting a seal between opposed surfaces of such parts, said gasket having a cut-away segment adapted to be located between such surfaces, a shim extending across said cut-away segment and adapted to space said surfaces, said shim having ends attached to and overlapping portions of said gasket located beyond said surfaces, all of the shim between said surfaces being spaced from said gasket, said shim being provided with an opening for receiving securing means for said parts.

6. A combined shim and gasket adapted to be inserted between machine parts and comprising a gasket for effecting a seal between opposed surfaces of such parts, said gasket having an ear adapted to be located between bosses on such parts, said ear having a cut-away segment adapted to be located between such surfaces, a shim having a portion extending inwardly of the periphery of said cut-away segment and adapted to space said surfaces, said portion being provided with an opening for securing means for said machine parts, said shim having another portion adapted to overlap a portion of said gasket outside of said surfaces, and means for securing together the overlapped portions of said shim and gasket.

7. A combined shim and gasket adapted to be inserted between machine parts and comprising a gasket for effecting a seal between opposed surfaces of said parts, said gasket having a plurality of ears each provided with a cut-away segment, said segments being of elongated shape and adapted to be located between said surfaces and shims extending lengthwise of said cut-away segments and having ends overlapping gasket portions therebeyond, said shims being narrower than said cut-away segments to provide spaces on both sides thereof, and means for securing the ends of said shims to said gasket portions.

8. A combined shim and gasket adapted to be inserted between machine parts and comprising a gasket for effecting a seal between opposed surfaces of said parts, said gasket having a plurality of ears each provided with a cut-away segment, said segments being of elongated shape and adapted to be located between said surfaces and shims extending lengthwise of said cut-away segments and having ends overlapping gasket portions therebeyond, said shims being narrower than said cut-away segments to provide spaces on both sides thereof, and a clip for securing the overlapped portions of said shim and gasket.

9. A combined shim and gasket adapted to be inserted between machine parts and comprising a gasket for effecting a seal between opposed surfaces of such parts, said gasket having a cut-away segment adapted to be located between such surfaces, a shim extending crosswise of said cut-away segment and adapted to space said surfaces, and an integral finger on said shim extending through an overlapped portion of the gasket to secure the shim thereto.

FRANKLIN WOOLLEY FARNAM.
ROBERT G. FARNAM.

References Cited in the file of this patent

UNITED STATES PATENTS

| Number | Name | Date |
|---|---|---|
| 2,191,044 | Seligman | Feb. 20, 1940 |
| 2,455,982 | Dowty | Dec. 14, 1948 |